Patented Jan. 27, 1948

2,434,913

UNITED STATES PATENT OFFICE 2,434,913

FIBROUS PRODUCTS

Henry Dreyfus, London, and Donald Finlayson and Richard Gilbert Perry, Spondon, near Derby, England; Claude Bonard, administrator of said Henry Dreyfus, deceased, assignors, by direct and mesne assignments, to Celanese Corporation of America, a corporation of Delaware No Drawing. Application February 4, 1944, Serial No. 521,136. In Great Britain January 7, 1943

Section 1, Public Law 690, August 8, 1946
Patent expires January 7, 1963

11 Claims. (Cl. 117—144)

This invention relates to fibrous products, and in particular to the manufacture of cordage, for example, ropes, twines and cords, of regenerated cellulose. This application is a continuation-in-part of our application S. No. 437,992, filed April 7, 1942, now abandoned.

We have found that the physical properties, and especially the wet tenacity, handle and splicing properties, of materials of the kind referred to above, can be greatly improved by impregnating them with a hot solution of a water resistant cellulose ester or ether in a non-aqueous liquid. The temperature of impregnation should be above the boiling point of water and is preferably between about 120° C. and 150° C. By impregnation at such relatively high temperatures any moisture initially present in the materials can be substantially removed and adequate penetration by the impregnating solution can readily be obtained.

By the process of the invention ropes, cords and like products can be made which are compact, have a desirable "handle," can readily be spliced and are of considerably higher wet tenacity than the untreated materials or than materials treated with water-resistant esters or ethers of cellulose at lower temperatures.

By a water-resistant ester or ether of cellulose is meant one which, when exposed to an atmosphere of 60% relative humidity at 21° C. does not absorb more than 3.5% of its weight of water. Among water-resistant esters or ethers of cellulose we have found ethyl cellulose to be particularly satisfactory.

As indicated above, the ethyl cellulose or other water-resistant ester or ether is applied to the material in solution in a non-aqueous liquid. Preferably a hydrophobe liquid, for example a high boiling liquid hydrocarbon or mixture of liquid hydrocarbons is employed as the solvent. The best results have been obtained by impregnation at temperatures of about 120° to 150° C. Higher temperatures than this can be employed but care must of course be taken not to work at a temperature so high that the material treated, or the water-resistant ester or ether, is damaged. Somewhat lower temperatures may also be employed, but the temperature should be sufficiently high to secure thorough penetration of the solution into the material and substantial removal of the moisture content thereof, i. e., reduction of the moisture content below 2% and preferably below 1% or even below 0.5%. The impregnation may be effected under atmospheric pressure or under super-atmospheric pressure.

In addition to the impregnation with the cellulose derivative, the materials may be subjected to further treatments, designed, for example, to improve their resistance to attack by micro-organisms and their wearing properties. A treatment which is particularly valuable is to apply to the material a heavy metal salt, e. g., a copper or a zinc salt, of naphthenic acid or other soap forming acid, for example stearic acid. Zinc naphthenate has been found particularly useful, not only in protecting the rope against attack by micro-organisms, but also in enhancing its weather-resistance and abrasion resistance. The application of other water-insoluble metallic salts of carboxylic acids to the materials, in conjunction with the cellulose derivative treatment, also improves their wearing properties, rendering them more resistant to abrasion. Apart from the heavy metal salts referred to above, aluminium stearate has been found useful in improving the resistance to abrasion. All these salts can be applied to the impregnated materials in solution in a hydrophobe liquid which is not a solvent for the cellulose derivative. Kerosene and other petroleum fractions are examples of suitable liquids. The best results however have been obtained by applying such salts simultaneously with the cellulose derivative by the application of a hot solution of the cellulose derivative and metallic salt in a hydrophobe liquid. The invention also includes forming the metallic salts in situ on the materials, for example by reaction between a sodium soap or other soluble soap and a soluble salt of a metal which forms insoluble soaps. Improved resistance to abrasion is also conferred by the application of compositions containing linseed oil or other drying oils. Compositions containing lubricants such as mineral oils and graphite can also be employed. A composition containing clay and graphite dispersed in kerosene to which a little linseed oil has been added considerably enhances the resistance to abrasion. Another treatment which has been found to improve resistance to abrasion is to apply a composition containing an oil such as omega oil, and rubber latex in an aqueous dispersion containing ammonium stearate or other ammonium soap. The ammonium soap may subsequently be decomposed by heating the treated rope.

The following examples illustrate the invention:

Example I

The material treated is a three-stranded rope made, by successive doubling operations with opposite directions of twist, from regenerated cellulose yarn of tenacity about 6 gms. per denier which has been made by the complete saponification of dry spun continuous filament cellulose acetate yarn which has been stretched in steam or hot water.

The rope is impregnated with a 5 to 10% solution of ethyl cellulose in light grade coal tar solvent naphtha at a temperature of about 120 to 150° C. During the impregnation moisture is driven off from the material in the form of steam and to obtain the best results the rope should remain in contact with the impregnating bath until substantially the whole of its moisture content has been so removed. The rope is then removed from the bath, freed from excess of the impregnating solution by treatment in a centrifuge, and dried at about 80–90° C.

The dried rope contains about 5 to 10% of its original dry weight of ethyl cellulose. It is superior in wet-tenacity, water-resistance and handle to the untreated rope and has improved splicing properties.

*Example II*

A rope treated according to Example I is subjected to further impregnation with a cold solution of copper naphthenate in kerosene. The impregnation is effected by running the rope through the bath containing the solution of copper naphthenate at such a speed that the rope is in contact with the bath for about 30 seconds. The concentration of the naphthenate in the bath is such that the treated material after drying off the kerosene, contains about 0.5 to 2% of its weight of copper in the form of copper naphthenate.

The treated rope is of high water-resistance and wet-tenacity and is also improved in handle, splicing properties, and durability when exposed for long periods to sea water and to damp atmospheres.

*Example III*

The process is carried out as in Example II but substituting zinc naphthenate for copper naphthenate. The treated rope shows an improvement in properties similar to that of Example II, coupled with greater resistance to abrasion.

*Example IV*

The process is carried out as in Example I except that the bath contains in addition to the ethyl cellulose copper naphthenate in such concentration that the rope, after removal of the solvent, contains about 0.5 to 2% of its weight of copper in the form of copper naphthenate. This method involving the simultaneous application of the copper naphthenate and the ethyl cellulose, is to be preferred to the method described in Example II, as giving even higher water-resistance and wet-tenacity.

*Example V*

The process is carried out as in Example IV but substituting zinc naphthenate for copper naphthenate. The treated rope shows an improvement in properties similar to that of Example IV coupled with greater resistance to abrasion.

Instead of solvent naphtha in the above examples toluene or any of the xylenes can be employed preferably at somewhat lower temperatures, for example about 120° C. Lower temperatures still may be employed in all the examples but the best results have been obtained at temperatures at least as high as 120° C.

Instead of, or in addition to the treatment with a heavy metal naphthenate, the material may be loaded with other water-insoluble metallic salts of organic acids. For example water-insoluble soaps such as the stearates, palmitates and oleates of zinc or calcium can be applied to the materials after or during the application of the cellulose derivative, preferably from solution or suspension, in a hydrophobe liquid that is not an active solvent for the cellulose derivative. A composition of considerable utility in increasing the abrasion resistance of the ropes of the invention can be made up as follows:

| | Parts |
|---|---|
| Water | 1,898 |
| Zinc oxide | 20 |
| Tannic acid | 10 |
| Boiled linseed oil | 2 |
| Castor oil | 50 |
| Pyridine | 10 | the parts being by weight.

The composition resulting from mixing these constituents may be applied to the rope after impregnation with the cellulose derivative and drying, by a bath treatment at a temperature of about 30 to 50° C. after which rope is again dried.

A further treatment which may be applied to increase the abrasion resistance involves the application of graphite to the material preferably together with a drying oil. Thus for example the rope, after impregnation with the cellulose derivative followed by drying, may be further impregnated with a solution of the following composition:

| | Parts |
|---|---|
| Kerosene | 75 |
| Graphite | 2 |
| Clay | 2 |
| Boiled linseed oil | 2 | the parts being by weight. The impregnation may be effected at ordinary or elevated temperatures and the rope then dried.

The ropes or other products treated may be formed from continuous filament yarns, staple fibre yarns or stapilised or abraded yarns. The filaments or fibres of regenerated cellulose from which the yarns are formed may be produced by any suitable process, for example, by the viscose process, the cuprammonium process, or by the saponification of filaments or fibres of an organic ester of cellulose.

The process of the invention is of particular advantage in connection with the treatment of twines, cords and ropes composed of or containing high tenacity filaments or fibres of regenerated cellulose. High tenacity filaments may be obtained by a wet-spinning process in the course of which the filaments are stretched very considerably, or, as indicated above, by the complete saponification of high tenacity filaments or fibres of an organic ester of cellulose, such as can be made for example by stretching filaments or fibres of the cellulose ester of ordinary tenacity in steam, hot water, or an organic stretch-assisting agent. Such high tenacity regenerated cellulosic filaments or fibres may have a dry tenacity of over 2 gms. per denier, for example 2.5 to 3, 4, or even more than 5 gms. per denier. The wet tenacity of such products is in general much lower than their dry tenacity. For some purposes this fact prevents full advantage being taken of the extraordinarily high dry tenacities of some of these products. The present invention, by enabling the wet tenacity to be considerably increased, greatly increases the utility of the products in question. The invention includes the treatment of twines, cords, ropes and other products containing regenerated cellulosic filaments or fibres whether of a normal, low, or high tenacity, in admixture with other textile materials, of natural origin, for example, cotton, linen, jute, ramie, hemp, manilla, silk and wool, or of artificial origin, for example cellulose esters or ethers, polymerised vinyl esters or ethers, or filament-forming polyamides.

Ethyl cellulose has beeen instanced above as a water-resistant cellulose ester or ether which can be employed with advantage in the process of the invention. Among other cellulose esters or ethers which can be so employed are other water-resistant ethers of cellulose, for example, propyl cellulose, benzyl cellulose, butyl cellulose, ethyl butyl cellulose, hexyl cellulose and ethyl hexyl cellulose; and cellulose esters, especially higher fatty acid esters, for example cellulose propionate, cellulose butyrate, cellulose acetate-propionate, cellulose acetate-butyrate, cellulose stearate, cellulose palmitate, cellulose acetate-stearate, cellulose acetate-palmitate, and cellulose laurate. There may be present in the composition containing the water-resistant ester or ether, a plasticiser or softener therefor, and this should be water-resistant. Plasticisers which are phosphoric esters have been found very suitable, for example, tricresyl phosphate, triphenyl phosphate and tri-(monochlor butyl) phosphate. Other plasticisers that may be used include dimethyl phthalate, dimethoxy-ethyl phthalate and tri-(monochlorethyl) phosphate. Certain fixed vegetable oils have also proved satisfactory, e. g. castor oil, olive oil and palm oil. Drying oils such as linseed oil and cotton seed oil are less satisfactory, as are mineral oils.

The treatment may be applied at any convenient stage in the manufacture of the products. Thus, in the manufacture of ropes of regenerated cellulose, the treatment may be applied to the filaments or fibres from which the yarns are made, to the yarns themselves, to the strands into which the yarns are formed, or to the rope itself. It is preferred, however, to apply the impregnation with the cellulose ester or ether to the rope as such, rather than to the components from which the rope is to be formed.

According to a modification of the invention, the materials are first treated so as substantially to remove their moisture content, for example by immersion in a bath of hydrophobe liquid at a temperature of about 120 to 150° C., and are then impregnated with the cellulose derivative before any substantial moisture regain has occurred. When the process is modified in this way the impregnation may be effected at lower temperatures, e. g., 60 to 80° or 100° C.

According to a further modification of the invention the treatments described above may be applied in the manufacture of ropes and like products composed of or containing fibres of synthetic linear polymers other than regenerated cellulose, of lower water-resistance than the impregnant. Thus, for example, ropes of an acetone-soluble cellulose acetate may be impregnated with ethyl cellulose, and ropes of other cellulose esters or of cellulose ethers, may be impregnated with cellulose esters or ethers of higher water-resistance.

Having described our invention, what we desire to secure by Letters Patent is:

1. Process for the manufacture of cordage which comprises impregnating cordage having a basis of fibers of regenerated cellulose of tenacity at least 2 grams per denier with a solution of a substance selected from the class of water-resistant esters of cellulose and water-resistant ethers of cellulose, in a hydrophobe liquid at a temperature of at least 120° C., and evaporating said liquid from the impregnated material.

2. Process for the manufacture of cordage which comprises impregnating cordage having a basis of continuous filaments of regenerated cellulose of tenacity at least 2 grams per denier with a solution of a substance selected from the class of water-resistant esters of cellulose and water-resistant ethers of cellulose, in a hydrophobe liquid at a temperature of at least 120° C., and evaporating said liquid from the impregnated material.

3. Process for the manufacture of cordage which comprises impregnating cordage having a basis of fibers of regenerated cellulose of tenacity at least 2 grams per denier with a solution of a water-resistant ethyl cellulose, in a hydrophobe liquid at a temperature of at least 120° C., and evaporating said liquid from the impregnated material.

4. Process for the manufacture of cordage which comprises impregnating cordage having a basis of continuous filaments of regenerated cellulose of tenacity at least 2 grams per denier with a solution of a water-resistant ethyl cellulose, in a hydrophobe liquid at a temperature of at least 120° C., and evaporating said liquid from the impregnated material.

5. Process for the manufacture of cordage which comprises impregnating cordage having a basis of continuous filaments of regenerated cellulose of tenacity at least 2 grams per denier with a solution of a water-resistant ethyl cellulose, in a liquid consisting substantially of aromatic hydrocarbons boiling between 110 and 160° C. at a temperature of at least 120° C., and evaporating said liquid from the impregnated material.

6. Process for the manufacture of cordage which comprises impregnating cordage having a basis of fibers of regenerated cellulose of tenacity at least 2 grams per denier with a solution of a heavy metal naphthenate and of a substance selected from the class of water-resistant esters of cellulose and water-resistant ethers of cellulose, in a hydrophobe liquid at a temperature of at least 120° C., and evaporating said liquid from the impregnated material.

7. Process for the manufacture of cordage which comprises impregnating cordage having a basis of fibers of regenerated cellulose of tenacity at least 2 grams per denier with a solution of copper naphthenate and a water-resistant ethyl cellulose, in a hydrophobe liquid at a temperature of at least 120° C., and evaporating said liquid from the impregnated material.

8. Process for the manufacture of cordage which comprises impregnating cordage having a basis of fibers of regenerated cellulose of tenacity at least 2 grams per denier with a solution of zinc naphthenate and a water-resistant ethyl cellulose, in a hydrophobe liquid at a temperature of at least 120° C., and evaporating said liquid from the impregnated material.

9. Process for the manufacture of cordage which comprises impregnating cordage having a basis of fibers of regenerated cellulose of tenacity at least 2 grams per denier with a solution of a substance selected from the class of water-resistant esters of cellulose and water-resistant ethers of cellulose, in a hydrophobe liquid at a temperature of at least 120° C., evaporating said liquid from the impregnated material, impregnating said material with a solution of a heavy metal naphthenate in a hydrophobe liquid, and evaporating said liquid.

10. Process for the manufacture of cordage which comprises impregnating cordage having a basis of fibers of regenerated cellulose of tenacity at least 2 grams per denier with a solution of a water-resistant ethyl cellulose, in a hydrophobe liquid at a temperature of at least 120° C., evaporating said liquid from the impregnated material, impregnating the said material with a solution of copper naphthenate in a hydrophobe liquid, and evaporating said liquid.

11. Process for the manufacture of cordage which comprises impregnating cordage having a basis of fibers of regenerated cellulose of tenacity of at least 2 grams per denier with a solution of a water-resistant ethyl cellulose, in a hydrophobe liquid at a temperature of at least 120° C., evaporating said liquid from the impregnated material, impregnating the said material with a solution of zinc naphthenate in a hydrophobe liquid, and evaporating said liquid.

HENRY DREYFUS.
DONALD FINLAYSON.
RICHARD GILBERT PERRY.

REFERENCES CITED

The following references are of record in the file of this patent:

UNITED STATES PATENTS

| Number | Name | Date |
|---|---|---|
| 1,918,294 | Seymour | July 18, 1933 |
| 1,997,857 | Charch | Apr. 16, 1935 |
| 2,087,013 | Bateman | July 13, 1937 |
| 2,098,535 | Charch | Nov. 9, 1937 |
| 2,098,542 | Charch | Nov. 9, 1937 |
| 2,177,627 | Drew | Oct. 31, 1939 |
| 2,205,210 | Latour | June 18, 1940 |
| 2,245,499 | Reichel | June 10, 1941 |
| 2,351,174 | Whitehead | June 13, 1944 |
| 1,676,362 | Seidell | July 10, 1928 |
| 2,108,804 | Finzell | Feb. 22, 1938 |
| 2,330,998 | Roon | Oct. 5, 1943 |